May 2, 1961 W. DUDLEY 2,981,967
WINDSCREEN WIPERS
Filed May 11, 1959
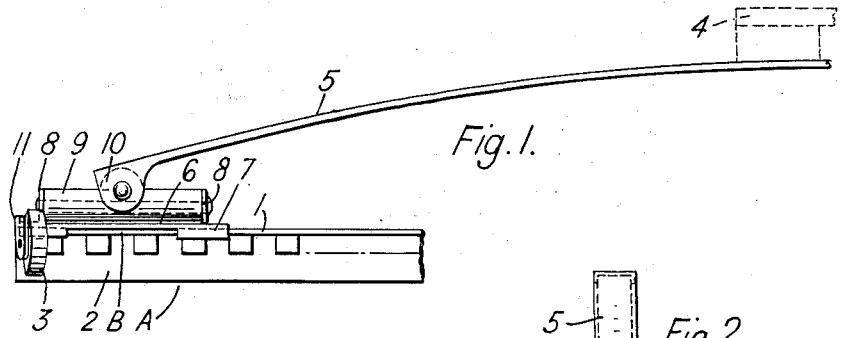
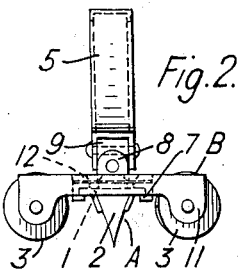
Fig. 3.
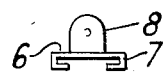
Fig. 5.
Fig. 4.
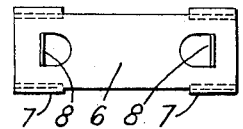
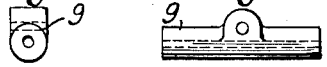
Fig. 6. Fig. 7.
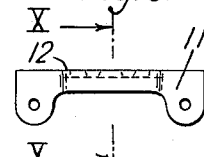
Fig. 8.
Fig. 10.
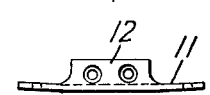
Fig. 9.

United States Patent Office 2,981,967
Patented May 2, 1961

2,981,967
WINDSCREEN WIPERS

Walter Dudley, Quadro Works, Arrow Road Factory Centre, Redditch, England

Filed May 11, 1959, Ser. No. 812,280

1 Claim. (Cl. 15—250.37)

This invention relates to windscreen wipers of the type having a wiper blade which is spring pressed on a windscreen and which is flexible longitudinally to maintain contact with the screen along its length when the line of contact is curved.

When an oscillating wiper arm moves in an arcuate path over a curved windscreen, the normal to the place of contact with the windscreen at one end of the wiper blade will in some positions be at an angle to the normal at the place of contact with the windscreen at the other end of the wiper blade and consequently detract from an efficient wiper action, and this invention has for its object a wiper blade structure in which the tip of the squeegee strip will be presented to the windscreen for efficient wiping action under curvature variations. A further object of the invention is to ensure that the support for each end of the wiper blade will be held in a holder at right angles to the normal to the windscreen at the point of contact.

Referring to the drawings:

Figure 1 is a side elevation of one half of a wiper blade before the wiper blade is applied to a curved windscreen.

Figure 2 is an end elevation of Figure 1.

Figures 3, 4 and 5 are respectively side elevation, plan and end view of a fitting engaged on the end of the wiper blade.

Figures 6 and 7 are respectively end view and side elevation of a bearing block.

Figures 8 and 9 are respectively front view and plan of a fitting on which rollers are mounted, and Figure 10 is a section on line X—X of Figure 8.

According to one form of the invention, the wiper blade comprises a flat strip or backing 1 of flexible metal or other material to which a squeegee strip 2 of rubber or the like is fixed by any suitable method, the rubber strip 2 being substantially triangular in cross section with the base of the triangle fixed on the flat face of the strip or backing 1. The rubber strip is thus flexible longitudinally to follow the curved shape of a windscreen. The wiper blade A is carried by a spring blade device shown as a bowed spring blade 5 which is rigidly fixed to the wiper arm 4 fixed to the spindle which is oscillated for oscillating the wiper blade over the windscreen. The squeegee strip 2 being triangular in cross-section tends to assume a straight line and give resiliency to the wiper blade. Each end of the carrier strip 5 is connected by a universal joint to the wiper blade A. In one form, a joint bracket B comprises a plate 6 having lugs 7 shaped to form a groove slidably engaging the strip 1, and also lugs 8 in which a pin is mounted on which a bearing block 9 of nylon or anti-friction plastics material is mounted. Lugs 10 on the carrier strip or arm 5 are pivotally mounted on the bearing block 9. A pair of rollers 3 are mounted on a fitting 11 having a lug 12 which is fixed by screws to the end of the plate 6.

With this construction, the pair of rollers 3 on each end of the wiper blade, position the wiper blade in relation to the surface of a windscreen, which surface is outwardly curved, thus the rubber strip 2 at the centre or midway of its length bears on the windscreen and with the pressure on the brackets B carrying the rollers 3, causes the rubber strip 2 to bear at its ends on the windscreen and consequently along its full length on the windscreen. The rollers distance the rubber strip 2 in relation to the screen and the universal joint allows the wiper blade to rock in relation to the arm 5. The rollers 3 will take the pressure of the wiper blade on the windscreen and the centre of the squeegee strip 2 will press on the windscreen by reason of the resiliency of the strip. The wiper blade, formed of brass strip 1 and the rubber strip, is capable of twisting, so that each end carrying a pair of rollers are independently free to follow the shape of the screen.

A pair of rollers may be fixed on the strip 1 of the wiper blade on a cross bridge piece which overhangs on each side of the strip at the centre of its length. In such case the centre pair of rollers would bear on the screen, and the outer pairs of rollers 3 will be pressed by the arm 5 into contact with the windscreen and thereby bend the blade to the curvature of the screen.

In lieu of the carrier strip 5, other means for supporting the wiper blade from the wiper operating rod 4 may be utilised which may be considerably varied and may apply, if desired, pressure on the wiper blade at intervals along its length.

Having thus described the invention, what is claimed as new and desired to be secured by Letters Patent is:

A wiper blade structure for attachment to an oscillating operating arm for moving the blade structure over a windscreen having a curved surface, comprising a wiper squeegee blade having a backing which is flexible longitudinally so that it can be bowed and also flexible in a lateral twisting direction, a bracket mounted on each end of said backing of the wiper blade which overhangs in a lateral direction on each side of the backing, a roller mounted on each overhanging end of each braket to run on the windscreen when the wiper arm is moved in a wiping direction, a spring blade device adapted to be fixed on the wiper operating arm and universal joints for connecting the ends of said spring blade structure to said brackets on the backing of the wiper blade, so that all the rollers are maintained in contact with the windscreen with the varying conditions of curvature of the windscreen.

References Cited in the file of this patent

UNITED STATES PATENTS

| | | |
|---|---|---|
| 1,670,266 | Marlow | May 15, 1928 |
| 1,779,344 | Tarver | Oct. 21, 1930 |
| 2,618,805 | Rappl et al. | Nov. 25, 1952 |
| 2,859,466 | Sanden et al. | Nov. 11, 1958 |

FOREIGN PATENTS

| | | |
|---|---|---|
| 457,809 | Great Britain | Dec. 7, 1936 |
| 935,297 | Germany | Nov. 17, 1955 |